United States Patent Office 2,920,433
Patented Jan. 12, 1960

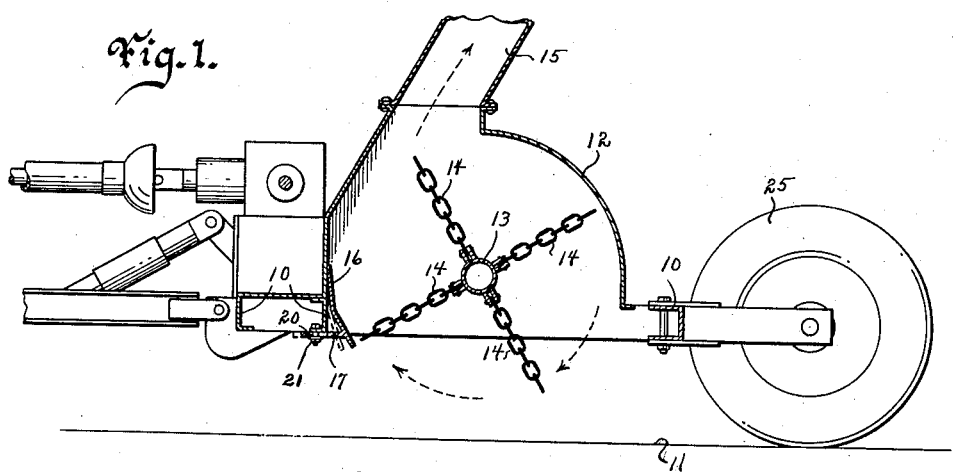
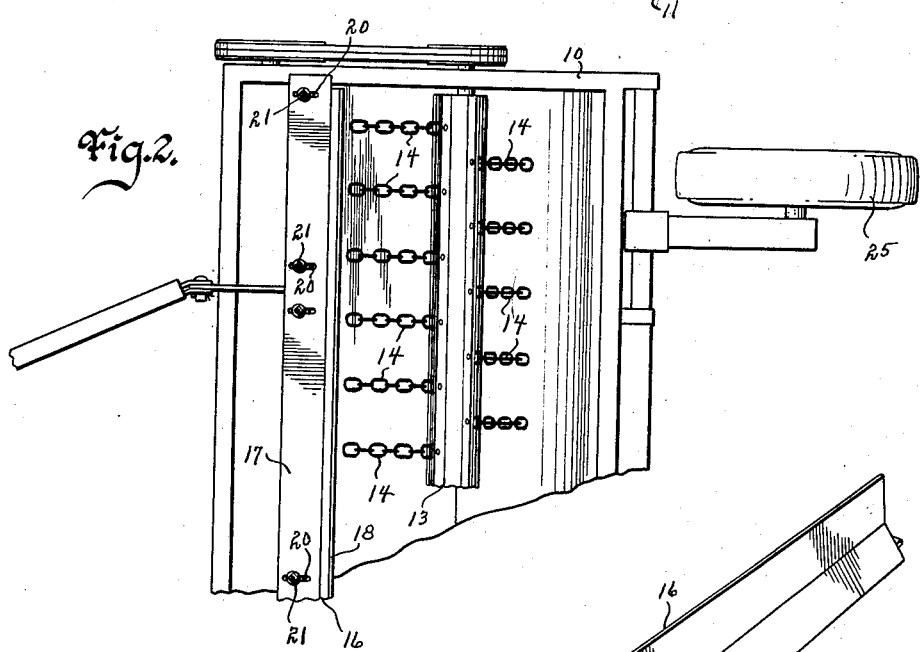
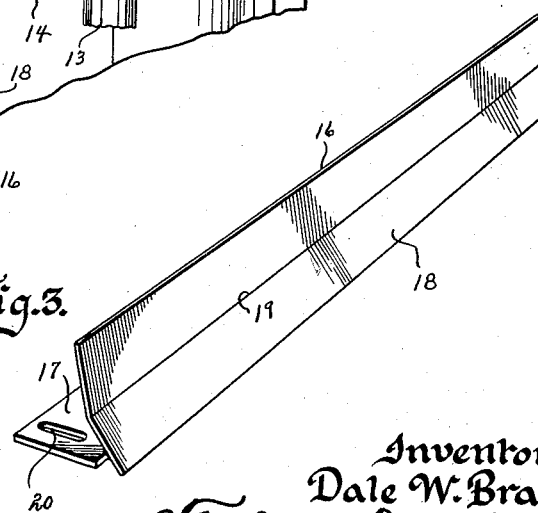

2,920,433

CROP HARVESTING IMPLEMENT

Dale W. Brady, Altoona, Iowa

Application June 2, 1955, Serial No. 512,842

2 Claims. (Cl. 56—24)

This invention relates to farm equipment and more particularly to implements for cutting, harvesting and/or macerating such crops as cane, cornstalks, cotton stalks, hay, beans, vines and like.

In recent years there have been various cornstalk macerators placed on the market. Originally, their purpose was to kill corn borers and to reduce the cornstalk to a size to permit successful subsequent earth cultivation. One of the most successful species of corntalk cutters were ones that used lengths of chains on a rotating cylinder as the pulverizing and breaking medium. However, due to excessive dirt and dust engendered by the flaying lengths of chain, I experimented with an inverted hopper or chute over the cutting and breaking chains for collecting and exiting the severed material to the rear and if desired into a collecting wagon. However, with the depositing of the material, such as broken cornstalk, into a collecting vehicle, it became obvious that such material might well be of value. From experiments I found that such macerating implements were particularly adapted to the harvesting of such as hay and like green crops, i.e., the device would successfully cut the crop, and deposit it into the collecting wagon in one operation in the form of silage. This was indeed a successful step in harvesting but I soon found that the device would not operate uniformally under all conditions. While the specific crop was a factor per se, I found that the state of its maturity was also an important factor. Furthermore, the amount of moisture content changed the results. Also there was no method of regulating the size of the pieces being deposited in the collecting vehicle box.

Therefore, one of the principal objects of my invention is to provide a crop harvester that may be easily and quickly adjusted to successfully handle different crop material.

A further object of my invention is to provide a harvester that is adjustable for regulating the size of crop pieces being gathered.

A still further object of this invention is to provide a crop harvesting implement that separates and discards much of the foreign matter such as dirt, stones and like from the crop being harvested.

Still further objects of this invention are to provide a crop harvester that is durable in use and economical in manufacture.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side sectional view of chain crop cutting type of implement employing my invention, Fig. 2 is a bottom view of my crop harvester and more fully illustrates its construction, and Fig. 3 is an enlarged perspective view of my elongated adjustable baffle bar knife.

In the drawings I have used the numeral 10 to generally designate the chassis of a crop macerator, supported above the ground surface 11 by wheel means 25 and by having its forward portion secured to the pulling vehicle such as a tractor (not shown). Such harvester chassis of this type have an inverted hood element 12. Extending under the inverted hood in spaced relationship is a rotatably mounted shaft 13 arranged transversely of the direction of travel of the implement. Secured at one end and spaced apart from each other on the shaft are a plurality of chain lengths 14. While such shafts 13 may be rotated by an engine on the chassis, most are operatively connected to the power take off of the tractor (not shown). This is, however, not a part of my invention, it being understood that the shaft 13 may be rotated by any suitable means. The numeral 15 designates an inverted hopper or chute element on and communicating with the inside top of the inverted hood for receiving the severed crop and passing the same rearwardly. It is to such well known equipment that I apply my present invention and which I will now describe in detail. The numeral 16 general designates my adjustable elongated horizontal baffle cutting knife bar. This member 16 has a horizontal bar portion 17 and an angle bar portion 18 secured on the rear edge of the portion 17 as shown in Fig. 3. This portion 18 is bent forwardly on its center line 19 and its lower edge portion extends downwardly and rearwardly to a horizontal plane below the horizontal plane of the portion 17 as shown in Fig. 1. The numeral 20 designates transervse slots in the portion 17. Vertical bolt means 21 extend through each of these slots 20 and the chassis 10 of the implement located forward of the forward bottom side of the inverted hood. With the bolt means in loosened condition the member 16 may be adjustably moved further from or closer to the arcs being cut by the chains 14. After the desired position of the member 16 is obtained, the bolt means is tightened, thereby rigidly securing the member 16 in place.

The practical operation of the device is as follows: With the implement being pulled over the crop to be harvested, the flaying chain lengths will cut arcs within the inverted hood, below it, and to the rear of the bottom edge of the bar knife portion 18. The chain lengths, as they pass through the crop, will move forwardly and upwardly as shown by arrows in Fig. 1. Chain lengths are, I believe more practical than rigid hammer or cutting blades, inasmuch as they are flexible, yet successfully yieldingly held radially by centrifugal force. Regardless, however, of the type of cutting flails, their purpose is to sever the crop, and move it upwardly to the inside top of the inverted hood, from thence it passes upwardly and rearwardly through the chute 15. This latter movement is caused by the members 14, which also act as flexible fan blades to cause a strong air current to pass upwardly and through the chute 15. This air current plus a certain amount of centrifugal force acting upon the severed crop move the severed crop to the rear. Obviously, without my member 16, the severed crop will follow a fixed pattern as to size of pieces that are exited to the rear. However, with my member 16 in place the amount of space between its lower cutting edge of the member 16 and the arc cut by the members 14 will determine to a great extent the size of the pieces passing through the chute 15. One reason for this is that the member 16 will also sever in two the crop passing by it. If the chain severed part of the crop is not long enough to extend over to the member 16, it will not be cut again by the member 16. Thus, the pieces will more uniformly be of the same size. Obviously, by adjustably moving the member 16 toward or away from the chains, the sizes of the crop pieces will be regulated. The member 16 also acts as a baffle for separating the crop from dirt, stones and like. This foreign matter, which is usually heavier, tends to be thrown outwardly by centrifugal force, and much of it will pass to the forward side of the part 18, and engage the horizontal bar portion 17, and thence from entrance into the inverted hood. Different crops, different condition of like crops, moisture and like, will require the forth or back adjustment of the member 16.

In instances my device will be used for destroying vegetation and not retain it as a valuable crop. This may well be in the case of cotton stalks, shrubbery, vines, cornstalks, and like. In such instances usually the material will not be passed to a collecting vehicle, but passed back upon the ground. The fineness of maceration may be of importance. The adjustment of the member 16 will produce the desired result.

Some changes may be made in the construction and arrangement of my crop harvesting implement without departing from the real spirit and purpose of my invention, and it is my intention to cover by my claims, any modified forms of structure or use of mechanical equivalents which may be reasonably included within their scope.

I claim:

1. In combination, a chassis, means for supporting said chassis above a ground surface, an inverted hood on said chassis having an escape opening in the top, a shaft rotatably mounted on said chassis and having its top spaced apart from the under side of said inverted hood; said shaft adapted to be rotated by suitable power means, flaying members spaced apart and secured on said shaft for cutting, breaking, and severing crops when said shaft is rotated; said flaying members when said shaft is rotated having their ends sweeping over the ground surface in the direction of movement of travel of the chassis over the ground surface, producing a centrifugal fan effect for moving the harvested crop upwardly and toward the inside top of said inverted hood, and a cutting bar knife secured to said chassis at the forward lower portion of said hood and adjacent the arc cut by said flaying members when said shaft is rotated; said cutting bar knife extending horizontally with its upper edge portion bent forwardly and with its lower edge portion extending downwardly and rearwardly at an angle to its upper edge portion.

2. In combination, a chassis, means for supporting said chassis above a ground surface, an inverted hood on said chassis having an escape opening in the top, a shaft rotatably mounted on said chassis and having its top spaced apart from the under side of said inverted hood; said shaft adapted to be rotated by suitable power means, flaying members spaced apart and secured on said shaft for cutting, breaking, and severing crops when said shaft is rotated; said flaying members when said shaft is rotated having their ends sweeping over the ground surface in the direction of movement of travel of the chassis over the ground surface, producing a centrifugal fan effect for moving the harvested crop upwardly and toward the inside top of said inverted hood, and a cutting bar knife secured to said chassis at the forward lower portion of said hood and adjacent the arc cut by said flaying members when said shaft is rotated, said cutting bar knife being bent upon its longitudinal center axis and positioned to have its two longitudinal half portions substantially tangent to the arc cut by said flaying members.

References Cited in the file of this patent

UNITED STATES PATENTS

| | | |
|---|---|---|
| 2,599,883 | Aske | June 10, 1952 |
| 2,634,570 | Brockman et al. | Apr. 14, 1953 |
| 2,718,741 | Meldahl | Sept. 27, 1955 |
| 2,734,328 | Wood | Feb. 14, 1956 |
| 2,786,317 | Lundell | Mar. 26, 1957 |